J. FARRELL.
HOISTING DRUM AND BRAKE FOR THE SAME.
APPLICATION FILED FEB. 19, 1915.
1,168,716.
Patented Jan. 18, 1916.
2 SHEETS—SHEET 1.
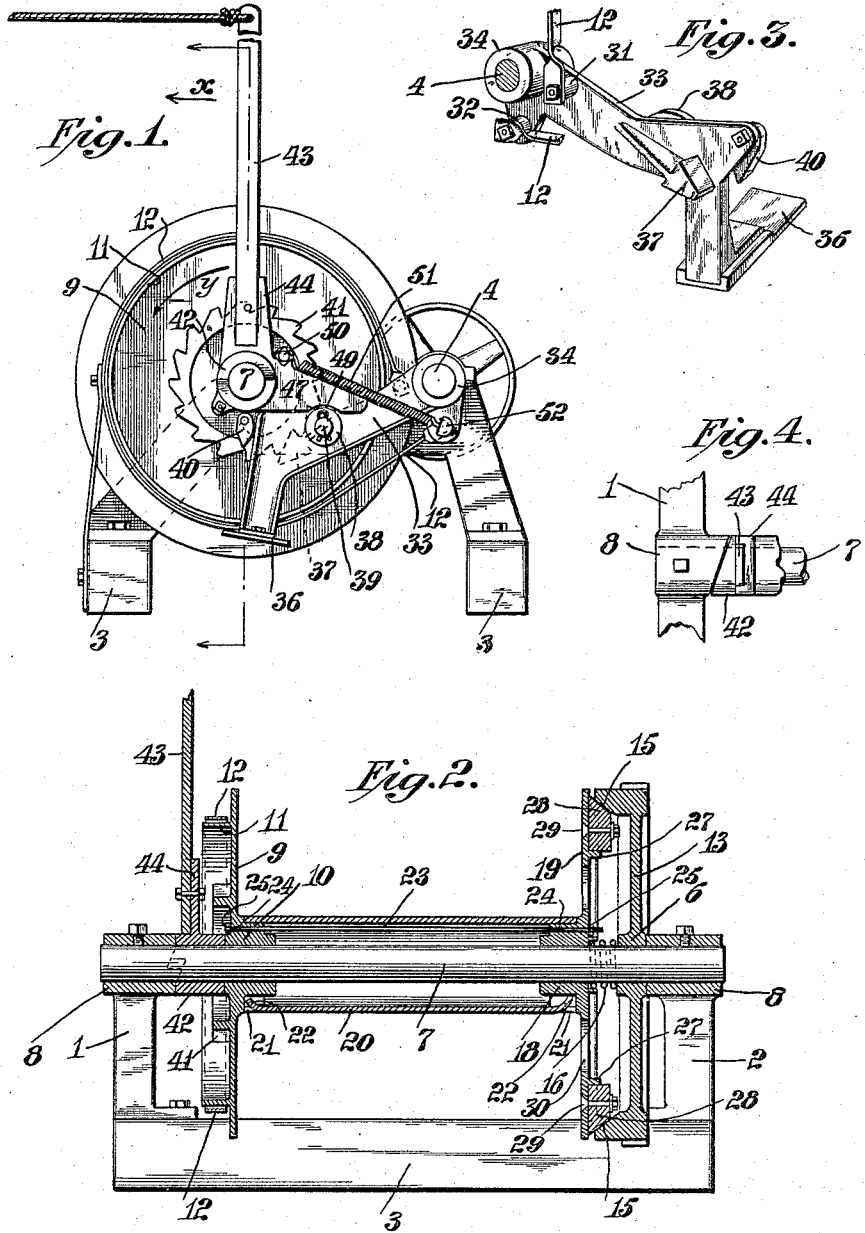
Attest:
Inventor:
J. Farrell
by his Atty J. FARRELL.
HOISTING DRUM AND BRAKE FOR THE SAME.
APPLICATION FILED FEB. 19, 1915.
1,168,716.
Patented Jan. 18, 1916.
2 SHEETS—SHEET 2.
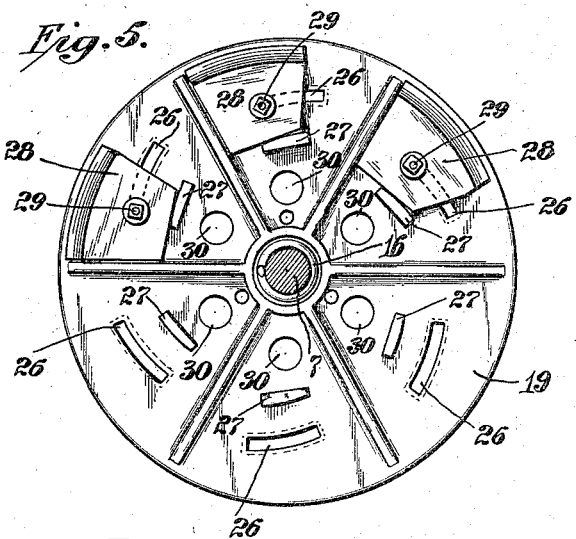
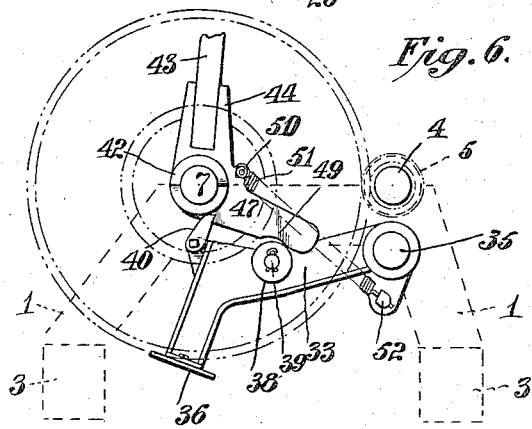
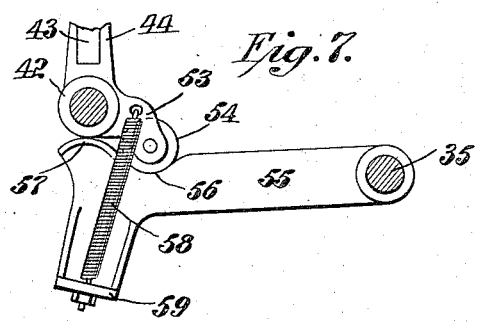
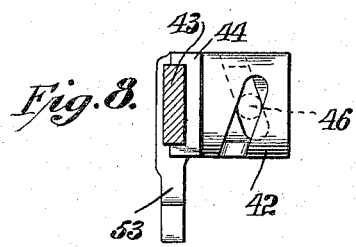
Attest:
Inventor:
J. Farrell.
by Oscar F. Gunn his Atty

UNITED STATES PATENT OFFICE.

JOHN FARRELL, OF NEWTON, NEW JERSEY.

HOISTING-DRUM AND BRAKE FOR THE SAME.

1,168,716.

Specification of Letters Patent. Patented Jan. 18, 1916.

Application filed February 19, 1915. Serial No. 9,386.

*To all whom it may concern:*

Be it known that I, JOHN FARRELL, a citizen of the United States, and a resident of Newton, in the county of Sussex and State of New Jersey, have invented certain new and useful Improvements in Hoisting-Drums and Brakes for the same, of which the following is a specification.

This invention relates to certain new and useful improvements in hoists.

The object of my invention is to provide a new and improved hoist which is simple in construction, strong and durable and which can be controlled by means of a single manipulating lever so that the load can be raised, or lowered, or held at any desired position at the will of the operator.

In the accompanying drawings in which one embodiment of my new and improved hoist is shown, in which like reference numbers indicate like parts:—Figure 1 is a side view of my new and improved hoist. Fig. 2 is a vertical central longitudinal sectional view of the same. Fig. 3 is a perspective view of the inner side of the brake operating lever. Fig. 4 is a detail plan view of the sleeve. Fig. 5 is an outside face view of the end disk, of the hoisting drum, which end disk constitutes one member of the clutch. Fig. 6 shows a modification in the mounting of the brake operating lever. Fig. 7 shows a modification of the brake operating lever. Fig. 8 shows a modified construction for shifting the drum by means of the handle lever.

The hoist is constructed with a frame consisting of two side members 1 and 2 and two base members 3 on which the side members rest. In suitable bearings on the side members a driving shaft 4 is journaled, which is provided with a suitable belt pulley or other driving contrivance and a pinion 5. A shaft 7 is mounted in bearings 8 on the side frame. At one end of this shaft a drum head or disk 9 is loosely mounted by means of its hub 10 and this head or disk is provided with a flange 11 forming the brake surface around and over which the brake band 12 passes which is attached to a lever as will be described hereinafter. On the opposite end of the shaft 7 a cog wheel 13 is mounted which is engaged with the pinion 5 on the drive shaft. The rim of this cog wheel is beveled on the inner surface as at 15 to form one member of a friction clutch. Adjacent to the hub 6 of the cog wheel 13 a helical spring 16 surrounds the shaft 7 and bears on said hub 6 and also against the hub 18 of a disk 19 forming the other member of the friction clutch. The disks 9 and 19 form the end walls or heads of a hoisting drum, the core of which is formed of a cylinder 20, formed of a piece of metal tubing, fitting on the hubs 10 and 18 respectively, of the disks 9 and 19, which tubing is prevented from turning independently of the end disks by forming recesses 21 in the hubs and bending tongues 22 formed of part of the end of the tubing, into said recesses. To prevent the two disks forming the heads of the rope or hoisting drum from spreading from each other, rods 23 are passed through holes 24 in the hubs and inside the tubing and are secured by nuts 25 at their ends at the outsides of the disks. The disk 19 is provided with a number of segmental slots 26 which are arranged eccentrically, that is to say, one end is nearer the periphery of the disk 19 than the other end and at said slots the disk is provided on the side facing the cog wheel with ledges 27 which have one end nearer the rim of the disk than the other end, so as to be practically inclined in the same proportion as the slots 26. Upon said ledges 27 wooden clutch blocks 28 rest, which clutch blocks have their outer segmental edges beveled the same as the inner bevel of the rim of the cog wheel 13. Said wooden blocks are substantially wedge shaped and through a hole in the same and through the corresponding slot 26 in the disk 19 a bolt 29 is passed for securing them in place and provided with a nut for drawing them up tight. In case these clutch blocks become worn on the segmental surfaces, the bolts 29 are loosened and the clutch blocks are shifted. As the clutch blocks increase in width from one end to the other in the direction of their length and in reverse direction of the rotation of the disk and as they rest snugly on the ledges 27, their binding edges are moved outward to take up wear. As the bottom edges of the blocks are made straight and rest firmly upon the ledges, which as stated, are inclined slightly toward the periphery of the disk, and as the slots are inclined in proportion to the ledges, and as the blocks are held by a bolt passed through the slots, the result is that the blocks are not tilted on the bolts but are shifted slightly on the ledges and in the slots when adjusted and no wedges or other contrivances are required for giving the blocks a firm and secure rest.

The disk 19 is provided with a series of holes 30 around the center for securing the hoisting rope. The brake band 12 is passed around the brake flange 11 on the disk 9 and has its ends attached to two bosses 31 and 32 of an angle lever 33 having a hub 34 at the angle, which is loosely mounted on the steel stud 35 cast in the frame of the machine or loosely mounted on the driving shaft, which lever at the end of its longer arms is provided with a downwardly projecting extension to the lower end of which a projecting foot rest or pedal 36 is fastened. On the inner side of this brake band lever 33 a tooth 37 is formed for a purpose which will be set forth hereinafter. On the outside a roller 38 is mounted on a pivot 39 for a purpose which will be set forth hereinafter.

A pawl 40 is pivoted at the end of the long arm of the lever 33 opposite the hub and when hanging down vertically it serves no purpose but when swung up and over the rear end of the long arm of the lever, it serves to hold said lever down and to hold the tooth 37 out of engagement with the teeth of the ratchet wheel 41 formed concentrically on the outside surface of the disk 9.

On the shaft 7 a sleeve or thrust box 42 is mounted loosely between the fixed bearing on the frame and the hub of the disk 9 against which it bears. One end of this sleeve is cut off diagonally or helically, Fig. 4, to correspond with the similarly shaped part on the bearing on the frame so that when this sleeve is moved axially from its normal position in the direction of the arrow $x$, it will press the entire hoisting drum lengthwise against the spring 16 and closes the clutch, whereas when this sleeve is in normal position, it permits this spring to expand to such an extent as to move the drum and open the clutch. An upwardly projecting arm 44 is formed on this sleeve and serves to receive a manipulating lever of greater or less length, 43. Instead of constructing one end of the sleeve 42 as a cam as provided above, it may be provided with an inclined slot through which a pin 46 passes from the shaft. By turning the sleeve axially it is moved lengthwise to exert a pressure upon the spring pressed drum as described above. The sleeve is also provided with an arm 47 which rests upon the roller 38 on the previously described brake lever 33 and may be provided with a shallow notch 49 at that part that rides upon this roller. When this notch is provided it is for the purpose of causing a quicker action of the arm 47 upon the roller 38 in applying the brake and releasing the tooth 37. Where the arms 47 and 44 meet in an angle on the sleeve 42, a pin 50 is fixed to which one end of a spring 51 is fastened, the other end of this spring being attached to a boss or pin 52 on the free end of the shorter arm of the brake lever.

In the modification shown in Fig. 7, the sleeve 42 is provided with a short arm 53 carrying a roller 54 which bears upon the brake lever 55 having a depression 56 and a toe 57 adjacent to the depression. A spring 58 is attached to the arm 53 and to the pedal 59.

The operation is as follows:—When the machine is started, the driving shaft always rotates in the same direction and consequently the cog wheel 13 is always rotated in the same direction and is never reversed. When the handle lever 43 stands vertically, the drum is not engaged with the cog wheel nor is the brake band applied on the brake flange and the drum is free to rotate in either direction, it being understood that the lever 47 is held slightly lowered, to prevent engagement of the tooth 37 with the teeth of the ratchet wheel by the pawl 40 which is in raised position. In order to hoist, that is to wind the hoisting rope on the drum, the handle lever 43 is moved toward the rear as indicated by the arrow $x$ in Fig. 1, whereby through the action of the cam formed on the sleeve 42, which is connected with said handle lever, the drum is shifted lengthwise on its shaft in the direction from the bearing on the frame, at which the sleeve is located and thereby the blocks 28 are pressed against the inner side of the beveled flange of the cog wheel 13 and the drum, by friction, is rotated with the cog wheel. By moving the handle lever back to normal and vertical position or permitting it to move automatically by releasing it, the sleeve 42 is moved toward the bearing adjacent to the sleeve thus permitting the spring to press the winding drum in the direction toward this bearing, that is, to disengage the clutch blocks from the cog wheel, so that the drum is entirely free. The blocks 28 on the disk 19 with the beveled flange of the cog wheel, form a friction clutch of which the flange of the cog wheel forms a female member and the disk 19 with the blocks 28 forms a male member. In order to apply the brake, the handle lever 43 is moved from normal vertical position in the inverse direction of the arrow $x$ whereby the arm 47 on the sleeve 42 causes pressure upon the roller 38 of the brake lever and thereby the long arm of the brake lever is pressed downward and the brake band is tightened around the brake flange. By manipulating the brake lever in this manner, that is by moving the handle lever in the inverse direction of the arrow $x$, the brake lever is forced down against the tension of the spring 51. It will be noticed that in forcing down the brake lever, the arm on the brake lever to which the spring is attached is moved away from the shaft 7 on which the sleeve 42 is mounted. As soon as the brake lever is released, the handle rod 43 is swung back into normal position by the tension of the spring 51 and of course also the brake lever is raised by the tension of this spring. It is to be noticed that the arm 47 on sleeve 42 is moved away and freed from contact with roller 38 when the handle lever 43 is moved in the direction of the arrow $x$. It should also be noticed that the handle lever 43 is held in normal position and returned from either direction to said normal position, first by the action of the spring 16 acting on the drum and so against the sleeve 42, thus keeping it against the bearing on the same, and second, by the tension of the spring 51 in returning the arm 47 on the sleeve 42 into contact with the roller 38 on brake lever 33 when the operating lever has been released after it has been moved in the direction of the arrow $x$ and when the handle lever has been released after applying the brake i. e., moved in the inverse direction of the arrow $x$, by the tension of the spring, in raising the brake lever 33 and pressing the roller 38 upward against the arm 47 on the sleeve 42.

In closing the clutch it is always necessary to move the handle lever in the direction of the arrow $x$ but it is not necessary to move the handle lever in the inverse direction of the arrow in all cases for applying the brake, as the brake can be applied by pressing down on the foot pedal whereby the brake lever is swung down without shifting the handle lever. As soon as the foot is taken off the foot pedal, it releases the brake and the hoist is in normal position.

I have now described the operation as being controlled by a person standing at the hoist so that he can manipulate the handle lever directly. It frequently is required, especially when using the hoist as a "farmer's hoist", that is, one for unloading hay, that the person manipulating the fork holding the load shall also control the hoist from a point a greater or less distance away by attaching a rope to the handle lever 43. The person standing some distance from the hoist, by means of the rope attached to the handle lever 43 can pull the same in the direction of the arrow $x$ and thereby close the clutch between the drum and the driven cog wheel and the hoisting rope will be wound upon the drum. As soon as the load has been hoisted to the desired point, he simply releases the tension of the rope on the handle rod and permits the handle rod to assume its vertical position. Thereby the drum is disengaged from the rotating cog wheel and it is free to permit the hoisting rope to uncoil, that is the load to lower. He cannot manipulate the brake by using this aforesaid rope, but if occasion arises that it is necessary to hold the load in raised position or in half raised position, he can manipulate the brake by means of another rope attached to the handle lever and passed over suitable counterpulleys.

If the machine is to be operated in the manner just described, the brake lever must be held normally in a slightly lowered position so that its tooth 37 does not engage the teeth of the ratchet wheel 41 and cannot engage them and for this reason the pawl 40 is swung up so as to project above the longer end of the brake lever a short distance and to rest against the underside of the sleeve, which holds the brake lever so that the tooth 37 will just clear the ratchet wheel. If however the hoist is to be operated by a man standing by it and the ratchet wheel is to come into complete play, the pawl 40 is lowered and hangs down loosely as shown in Fig. 1 and has no function whatever and permits the brake lever to rise to such an extent that its tooth 37 will engage the teeth of the ratchet wheel. When the drum is turned in the direction of the arrow $y$ so as to hoist the load, the ratchet wheel slides over the tooth and the brake lever is moved up and down with a slight play. As soon as the clutch is disengaged so that the drum is no longer rotated in hoisting direction (arrow $y$) and turns in the reverse direction under the weight of the load, the tooth 37 immediately catches in the teeth of the ratchet wheel 41 so as to lock the same and the drum and prevent the load from descending. For example an operator can hoist a load and as soon as he releases the handle lever 43 and the same assumes its normal position, the load will be immediately locked by the engagement of the tooth 37 on the brake lever with the teeth on the ratchet wheel 41 and will stay there an indefinite time. Then the load can be hoisted still farther at any time by pulling the handle lever in the direction of the arrow $x$, or the load can be lowered by first pressing the handle lever 43 in the inverse direction of the arrow $x$, whereby the tooth 37 of the brake lever is disengaged from the ratchet wheel and the brake band is applied, more or less, according to the pressure brought on the handle lever and the load can be lowered slowly or rapidly and is under full control of the operator. In some cases it may be necessary to apply the brake and hold the drum securely before the drum is disengaged from the driving cog wheel. In such cases the operator presses his foot upon the brake lever and after he has applied the brake in this manner, he shifts the handle lever from hoisting position to the normal. The sleeve for throwing the drum in and out of gear is connected with the brake lever by a spring. This one spring serves to act on the handle lever and to act on the brake lever. It serves to press the brake lever to act against the ratchet teeth. It serves to return the brake lever into neutral position, and also returns the operating sleeve into neutral position.

The tension of the spring 51 exerted at the point 50 on the sleeve 42 and at the point 52 on the brake lever 33, causes the arm 47 and the roller 38 when no other pressure is exerted, always to return and remain in contact with each other at a certain fixed neutral position.

Having described my invention what I claim as new and desire to secure by Letters Patent is:—

1. The combination with a hoisting drum and a shaft on which it is mounted to slide lengthwise, of a driving cog wheel, a friction clutch interposed between said drum and driving cog wheel and operable by moving the drum lengthwise, a sleeve mounted on the shaft of the drum for moving the drum lengthwise, a manipulating handle on the said sleeve, a brake operating arm on said sleeve, a brake lever upon which the said arm can act and a spring connecting said sleeve with the brake lever, substantially as set forth.

2. The combination of a hoisting drum and a clutch for the same, means for shifting the same in relation to the clutch, a shaft for the drum, a sleeve mounted on the shaft, an arm on the sleeve for manipulating a brake lever, a pivoted brake lever, a band brake connected with one end of said lever, an arm on the pivoted end of said brake lever and a spring connecting this arm with the sleeve, substantially as set forth.

3. The combination of a hoisting drum and a clutch for the same, means for shifting the same in relation to the clutch, a shaft for the drum, a sleeve mounted on the shaft, an arm on the sleeve for manipulating a brake lever, a pivoted brake lever, a band brake connected with one end of said lever, an arm on the pivoted end of said brake lever and a spring connecting this arm with the sleeve and a pedal formed on an extension of the brake lever opposite the pivoted end, substantially as set forth.

4. The combination of a hoisting drum and a clutch for the same, means for shifting the same in relation to the clutch, a shaft for the drum, a sleeve mounted on the shaft, an arm on the sleeve for manipulating a brake lever, a pivoted brake lever, a band brake connected with one end of said lever, an arm on the pivoted end of said brake lever and a spring connecting this arm with the sleeve, the brake manipulating arm on the sleeve having a curved recess at its free end on the underside and a roller on the side of the brake lever, on which roller the arm on the sleeve rests, substantially as set forth.

5. The combination of a hoisting drum and a clutch for the same, means for shifting the same in relation to the clutch, a shaft for the drum, a sleeve mounted on the shaft, an arm on the sleeve for manipulating a brake lever, an angular brake lever provided at its angle with a hub by which it is mounted to turn, a brake band attached to this lever, and a spring attached to the end of the short arm of this lever and to the sleeve connected with the operating handle, substantially as set forth.

6. The combination with a hoisting drum, of a shaft on which it is loosely mounted, a wheel mounted on the shaft, a clutch for engaging the drum with this wheel, a sleeve on the shaft, an arm on said sleeve, a brake lever on which said arm acts, a spring connecting the sleeve with the brake lever, a tooth on the brake lever, a ratchet wheel on the drum, the teeth of which ratchet wheel are inclined reversely to the winding direction of the drum, substantially as set forth.

7. The combination with a hoisting drum, a shaft on which it is loosely mounted, a driving wheel mounted on the shaft, a clutch for engaging the drum with this wheel, a sleeve on the shaft, an arm on said sleeve, a brake lever on which said arm acts, a spring connecting the sleeve with the brake lever, a tooth on the brake lever, a ratchet wheel on the drum, the teeth of which ratchet wheel are inclined reversely to the winding direction of the drum and means for holding the tooth on the brake lever out of engagement with the teeth on the ratchet wheel, substantially as set forth.

8. The combination with a shaft, of a hoisting drum on the same, a driving cog wheel on this shaft, a friction clutch formed by the driving cog wheel and one disk of the drum, a spring for holding said clutch open, a sleeve on the shaft for operating the clutch through the drum, an arm on said sleeve, a band brake surrounding one end of the drum, a brake lever with which said band is connected, a spring connecting the sleeve and the brake lever, a handle lever on the sleeve whereby the handle lever can be shifted to close the clutch without manipulating the brake lever and is returned to normal position by said spring surrounding the shaft and by the spring connecting it with the brake lever and whereby the brake lever is operated by shifting said handle lever in the reverse direction from that into which it is shifted for closing the clutch, substantially as set forth.

9. The combination with a hoisting drum and its shaft, of a ratchet wheel on the drum, a band brake surrounding a part of said drum, a pivoted lever to which said brake band is attached, a tooth on said lever, a sleeve on the shaft of the drums, a spring attached to said lever and to said sleeve on the shaft of the drum, substantially as set forth.

10. The combination with a hoisting drum, of a ratchet wheel on the same, a brake band surrounding the drum, an angle lever pivotally mounted at its angle, the brake band being attached to a downwardly projecting arm of said lever, a tooth on the longer arm of said angle lever, which tooth can engage the ratchet wheel, a spring acting on the lever for pressing the tooth against the ratchet wheel and a means for holding said lever to temporarily disengage the tooth from the ratchet wheel, substantially as set forth.

11. The combination with a hoisting drum, of a ratchet wheel on the same, a brake band surrounding the hoisting drum, a lever pivotally mounted, with which said brake band is connected, a tooth on the said lever which can engage the ratchet wheel, a spring connected with the lever, a sleeve mounted on the shaft of the drum, an arm on said sleeve, with which sleeve the spring acting on the lever carrying the brake band is connected, substantially as set forth.

12. The combination with a shaft, of a hoisting drum loosely mounted upon said shaft and adapted to slide on the same, a driven cog wheel mounted on the shaft and having a rim beveled on its inner surface to form one member of a friction clutch, blocks which constitute the other member of the friction clutch and are fixed on the adjacent head of the drum, said blocks having a segmental outer edge and increasing in width from one end to the other, a single bolt passed through each block for securing it, the drum head having segmental slots, one end of which is nearer the periphery of the drum than the other and through which slots the said bolts are passed, and ledges beneath the slots, on which ledges the blocks rest, which ledges also have one end nearer the periphery of the drum than the other, substantially as set forth.

13. In a hoist, the combination with a shaft and a hoisting drum mounted loosely thereon and a drum rotating means, a sleeve on the shaft for manipulation to engage the drum with or disengage the drum from the rotating means, a brake for the drum, a lever connected with the brake for actuation thereof, means for shifting said brake lever from said sleeve and a spring attached to the sleeve and to the brake lever, substantially as set forth.

14. In a hoist, the combination with a driven shaft and a hoisting drum mounted loosely thereon and a drum rotating means, of a sleeve on the shaft for manipulation to engage the drum with or disengage it from the rotating means, a ratchet wheel on the drum, a brake for the drum, a pivoted lever with which the brake is connected, a member on said brake lever for engagement with the ratchet teeth, an arm on said sleeve for shifting the brake lever and a spring connected with said sleeve and with the brake lever, substantially as set forth.

Signed at Newton, in the county of Sussex and State of New Jersey, this 12″ day of February, A. D. 1915.

JOHN FARRELL.

Witnesses:
FRANK I. FARRELL,
IDA M. FARRELL.

Copies of this patent may be obtained for five cents each, by addressing the "Commissioner of Patents, Washington, D. C."